Patented July 11, 1944

2,353,308

UNITED STATES PATENT OFFICE 2,353,308

ICING

Sarah F. Joffe and Julian A. Joffe,
Mount Vernon, N. Y.

No Drawing. Application February 15, 1941,
Serial No. 379,116

1 Claim. (Cl. 99—139)

This invention relates to new and useful improvements in the method of applying icing or similar decorations to chocolates and the like, and to a new and improved product resulting therefrom.

As distinguished from the heretofore customary practice of applying icing, and particularly hard or royal icing, at room temperature, in accordance with the present invention, the icing is warmed before application and is used most conveniently at body temperature or somewhat higher.

This departure from the established practice simplifies the method of application and produces startling results, some of which will now be enumerated.

The icing when permitted to cool in situ will adhere much more firmly and harden quicker than when applied at room temperature. In many instances when attempting to remove the dried icing the chocolate broke before the icing.

By keeping the icing warm, e. g., by exposing it to steam, it will not harden in the extruding tool by means of which it is applied to chocolates. This facilitates the decorating operation and reduces the danger of frequent clogging up of tools.

Furthermore, it will not be necessary any more to soften icing with water, which had to be done frequently when the application was at room temperature. In prior processes, when the icing hardened it had to be removed from cans into flat bowls for careful mixing and remixing with water to produce a homogeneous, pliable product. Great care was always necessary to cover the bowls with damp towels or cloths to prevent drying. A bowl was needed for each of the usual three to six colors. In a crowded store, this was particularly objectionable. The icing was scooped from the bowls into bags or tubes, care being exercised against drying. In practice, drying was unavoidable and much icing was wasted as a consequence.

In decorating chocolates or the like, the icing is usually enclosed in a collapsible tube from which it is extruded by squeezing. When the icing hardens, the operation slows down and the muscular strain becomes too great on the operator. In accordance with the present invention, the icing is kept soft and pliable simply by warming the tube.

Since the icing is kept fluid by heating and without the addition of water, it will dry much quicker when applied to chocolates or other bearing surfaces. Furthermore, icing applied warm will have a higher gloss than when applied at room temperature.

The icing applied warm adheres more tenaciously, probably partly because no water need be added to keep it pliable. On account of this great adhesiveness, chocolates need not be coated with vegetable gums or shellac, and it is not necessary to wipe off the fatty film on the chocolate with a damp towel before applying the icing. In this connection it should be borne in mind that not only are these steps expensive, but that in some states the use of shellacs on chocolates is prohibited.

Another reason for the firm adherence of the icing to the chocolate surface may be that the icing when applied warm will melt the surface of the chocolate and thus become more firmly anchored than when applied cold.

The quick drying of the icing applied in accordance with the present improved process is of particular importance where chocolates are decorated in stores for waiting customers. Within five minutes icing applied in accordance with the present invention is as dry as icing applied cold after thirty minutes of drying.

Particularly good results were obtained with icing compositions containing soy bean proteins and particularly Albusoy described in the copending application of Julian A. Joffe, Serial No. 372,833, filed January 2, 1941. The icing developed a crust in one minute and dried much more rapidly than heretofore and when dry could not be pried off the chocolate.

When applied at room temperature, some batches of icing containing soy bean protein do not behave as satisfactorily as others, probably on account of differences in the soy bean product. When applied warm, icing containing soy bean protein adheres uniformly well. The present invention makes possible the use in icing of a greater variety and also smaller quantities of soy bean products than was heretofore thought possible.

The novel process can not, however, be practiced with all types of icing. Icing containing a small percentage of egg-white or dextrines will flow when applied to chocolates or other bearing surfaces instead of forming well defined decorations. Icing high in egg-white content may, however, be applied warm to good advantage.

The temperature to which the icing should be heated is not critical. Good results were obtained at temperatures of 85–120° F. The warmer the icing, the better are the results obtained.

Care must be taken, however, that none of the component parts are overheated.

It will be obvious to those skilled in that art that the present invention is applicable to other decorations than icing in the strict sense of the word, and that the icing or decorations may be applied to other bearing surfaces or substances than chocolates.

What is claimed is:

As a new article of manufacture a hard chocolate surface having firmly adhering thereto icing containing soy bean protein cooled in situ.

SARAH F. JOFFE.
JULIAN A. JOFFE.